Figure 1:
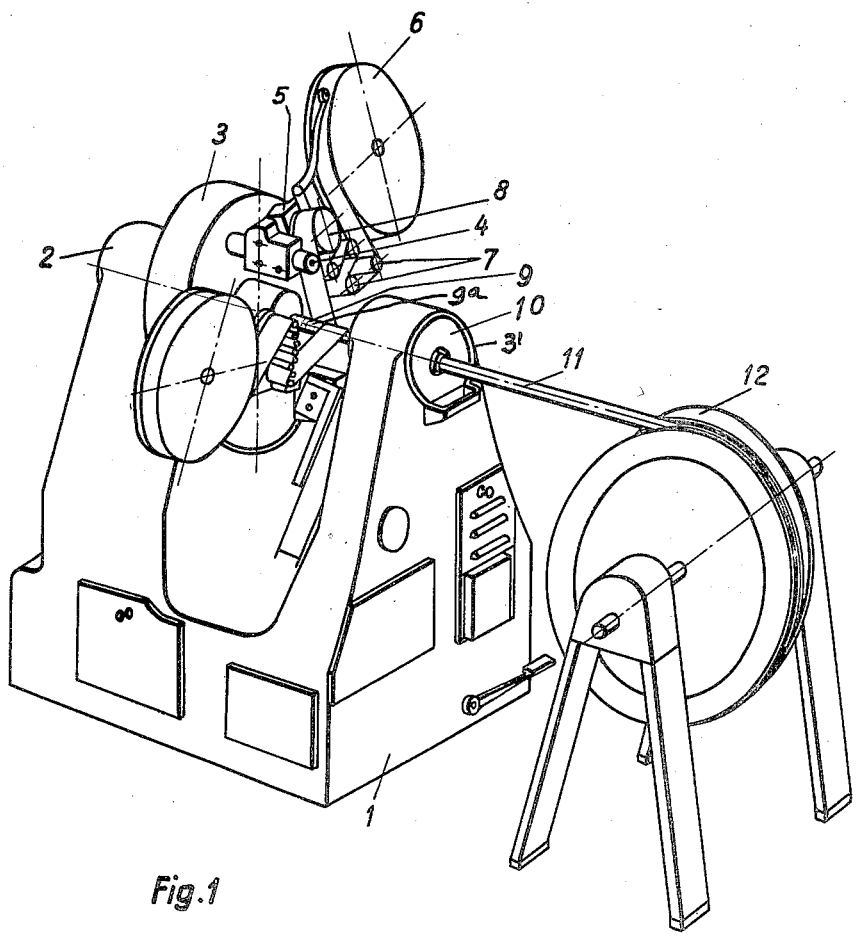

March 11, 1952   R. C. BREMER   2,589,041
METHOD OF FORMING FLEXIBLE ENDLESS TUBES
Filed Jan. 25, 1944   5 Sheets-Sheet 1

INVENTOR:
Rudolf C. Bremer
BY
Richards Geier
ATTORNEYS

March 11, 1952 R. C. BREMER 2,589,041
METHOD OF FORMING FLEXIBLE ENDLESS TUBES
Filed Jan. 25, 1944 5 Sheets-Sheet 2
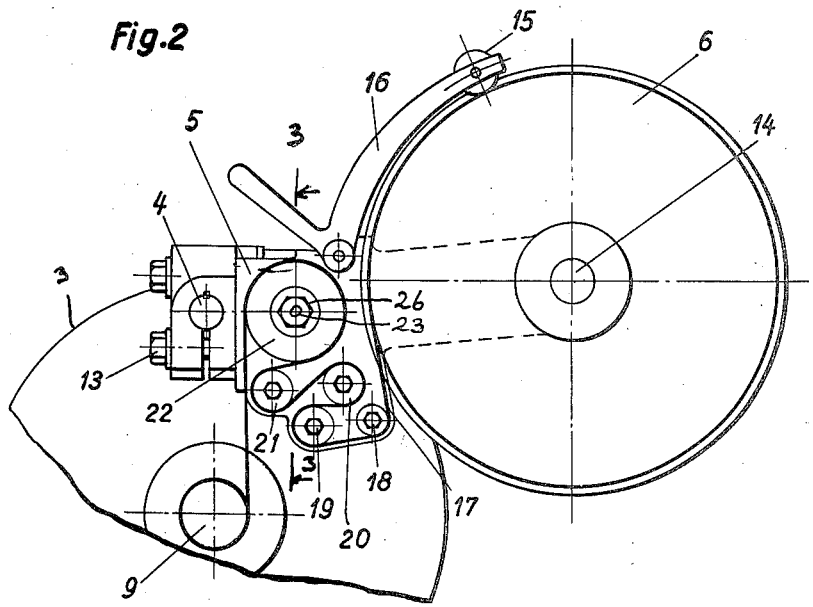
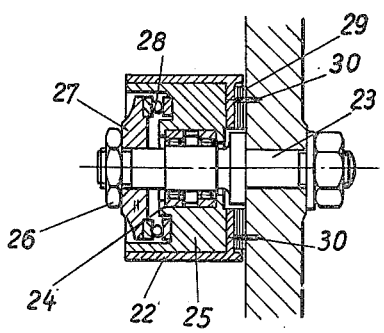
INVENTOR:
Rudolf C. Bremer
BY
Richard J. Geier
ATTORNEYS

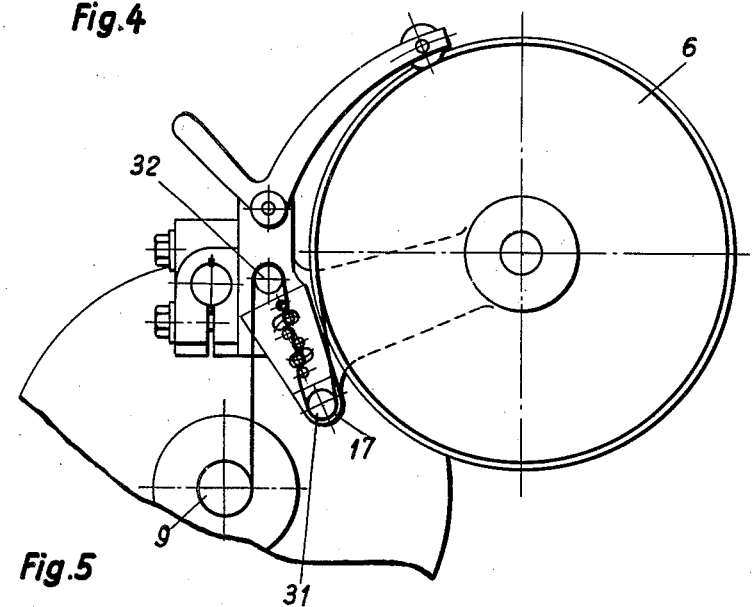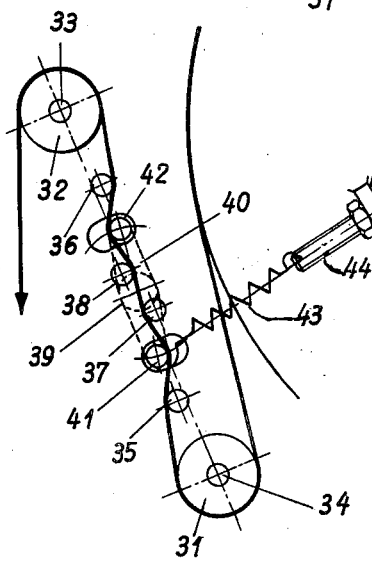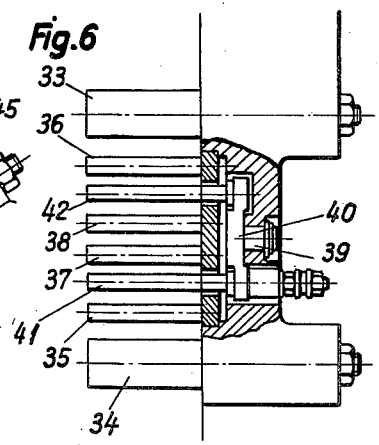

March 11, 1952 R. C. BREMER 2,589,041
METHOD OF FORMING FLEXIBLE ENDLESS TUBES
Filed Jan. 25, 1944 5 Sheets-Sheet 4

INVENTOR:
Rudolf C. Bremer
BY
Richard J. Geier
ATTORNEYS

March 11, 1952  R. C. BREMER  2,589,041
METHOD OF FORMING FLEXIBLE ENDLESS TUBES
Filed Jan. 25, 1944  5 Sheets-Sheet 5

INVENTOR:
Rudolf C. Bremer
BY
Richard y Geier
ATTORNEYS

Patented Mar. 11, 1952

2,589,041

UNITED STATES PATENT OFFICE 2,589,041

METHOD OF FORMING FLEXIBLE ENDLESS TUBES

Rudolf C. Bremer, Zurich, Switzerland

Application January 25, 1944, Serial No. 519,610
In Switzerland January 30, 1943

1 Claim. (Cl. 93—94)

In the heretobefore methods employed for manufacturing flexible endless tubes from spirally wound band material, this latter is wound round a rigid mandrel or core bar; it is pulled off the core bar by means of a thread device and at the same time made to form a tube by means of a groove assembly. The thread device produces a grooved tube; the grooves show an acute pressure angle and are of a shape similar to a trapezoidal thread. Now, in order to shape the thread grooves so as to ensure a close contact of the sides of the individual threads, and also in order to take up the torsion originating when pressing the grooves into the band material the tube issuing from the threaded system is upset by means of braking organs. These braking organs generally consist of a grooved stationary core over which the tube is pushed, and of one or more stationary rings, grooved or ungrooved. Both serve to upset the grooves and to hold the tube against the torsion stress.

These upsetting and smoothing organs have not come up to expectation in practical tube manufacture; it proved impossible by these means to make first-class flexible tubes of wound and grooved band material. This is due partly to the serious difficulties encountered in determining the most suitable dimensions for the upsetting and smoothing organs, and partly to the fact that these organs have to check a twisting movement and an advance. If the inner core is selected so as to ensure the correct upsetting of the tube grooves and the complete neutralization of the torsion the friction will be so great that the slightest differences in the thickness of the band material will cause the new tube issuing from the threaded device to get twisted asunder; moreover, any reliable cooling is made impossible. The same difficulties are met with in the outer braking ring.

When making coverings or armourings of tubular shape around solid objects, for instance when taping a cable, the use of a braking core is altogether impossible, since the cable fills the whole inside of the tube. The whole of the braking work has heretofore to be accomplished by the outer braking ring alone. Since the grooves must also be compressed in their diameter owing to the impossibility of making the core diameter of the thread on which the grooves are made as small as the cable to be taped, the braking ring has besides a certain amount of drawing work to do in order to reduce the inner tube diameter. As a consequence, the resistance of the tube in the braking ring becomes so great that in the long run cracks are bound to occur in the outer tube wall in spite of lubrication and cooling.

To pull off the band material wound round the solid core bar requires on the part of the threaded device the exertion of such great power that the use of the various dimensions of band material becomes greatly lmited and it is impossible to make each tube diameter with the particular wall thickness required; furthermore, there is such a great friction heat to cope with that after a comparatively short working period it is impossible to prevent the jamming or seizing of the parts rotating one within the other.

It has so far proved impossible to overcome these difficulties, more particularly the tearing-off after making short tube lengths, by means now known, consequently it has not hitherto been possible to make flexible endless tubes in one uninterrupted operation by using the process and appliances referred to above.

The present invention refers to a method of manufacturing by means of which endless flexible tubes can be made and cables taped to a practically unlimited extent; braking organs for upsetting the grooves and for taking up the torsion pressure originating when making the grooves—as described above—are not required. Similar tools in modified form may, however, be retained for smoothing the surface of the tubes, an operation which requires a very slight friction only. According to the present invention the material is no longer more or less superficially grooved, but on the contrary folded to a certain depth. The method hitherto used for winding the band material is also discarded.

In the process according to the present invention the band material is wound round a rotating core or hollow core conveniently provided with a transfer or conveying thread—under an initial tension sufficient to take up the torsional stress arising during the subsequent folding process; and the band material is guided into the folding tools and folded by means of a folding tube and folding core with folding nut—provided with a tapering thread—in such a manner that the individual folding fillets are lying close together when issuing from the folding nut.

The appliance for carrying out the present method is characterised by adjustable braking organs for taking up the torsional stress arising in the course of the subsequent folding process, and by a rotating core conveniently provided with a conveying thread and a folding thread, including further a folding nut; the fillets of the folding thread are tapering, i. e. their pitch and pressure angle are decreasing, in such a manner that the trapezoidal shape of the fold produced in the first fillet of the folding thread gets gradually steeper until the fold sides are lying close together when issuing from this tool.

Figure 7:
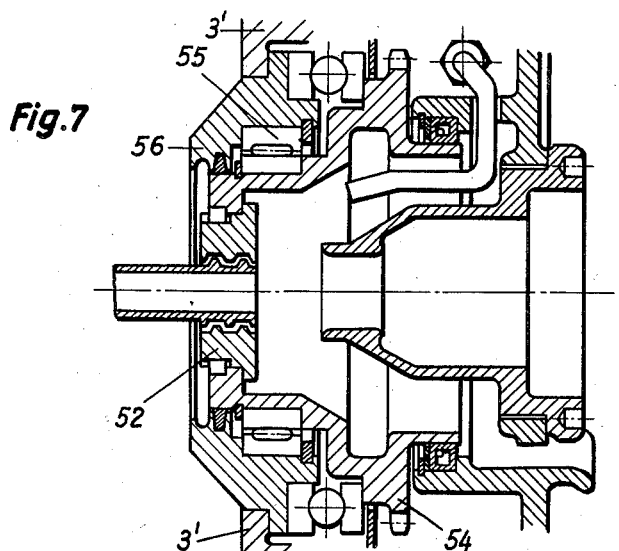
Figure 8:
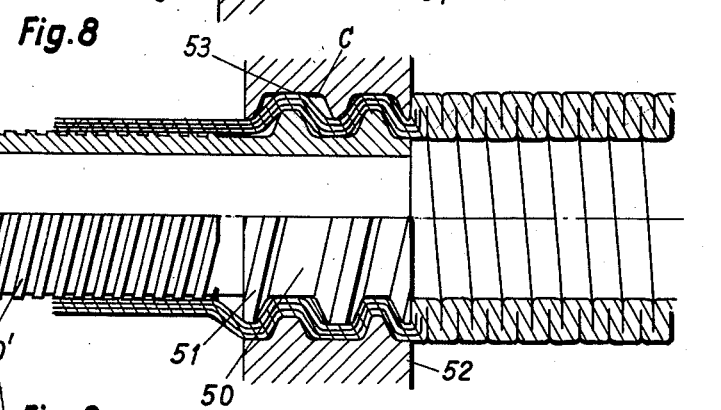
Figure 9:
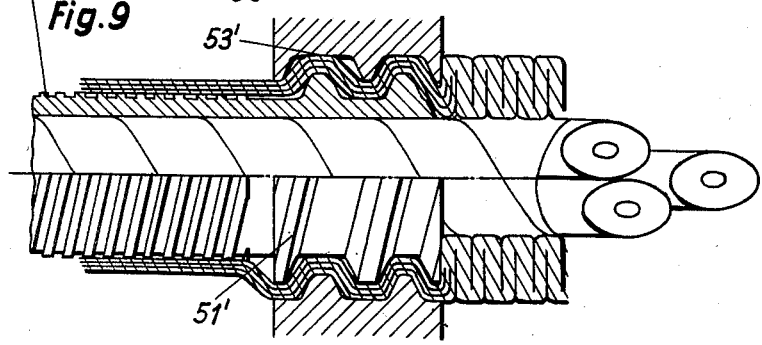
Figure 10:
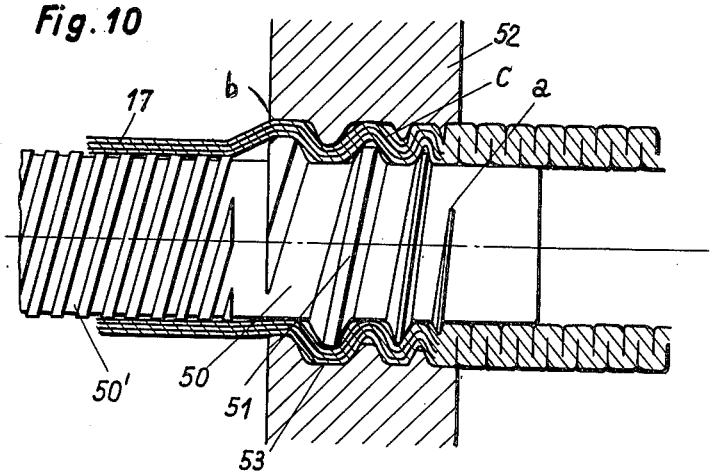
Figure 11:
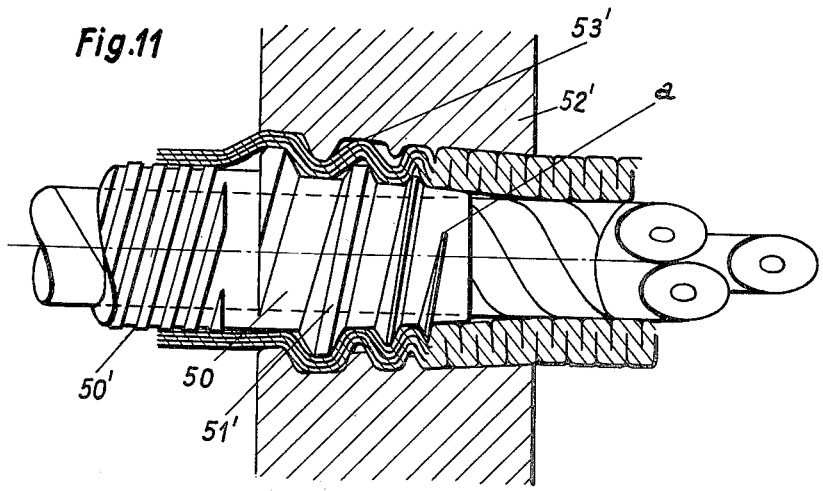

The attached drawing shows a constructional example of the realisation of the subject of this invention. In this drawing:

Fig. 1 represents a tube drawing press ;

Fig. 2—the arrangement of the band braking organs between band drum and core;

Fig. 3—the longitudinal section of a brakable band drum taken on line 3—3, Fig. 2;

Fig. 4—the arrangement of a braking serpentine way between band drum and core;

Fig. 5—a view of a serpentine brake;

Fig. 6—the same, partly in section;

Fig. 7—a section through the tool head;

Figs. 8 and 10—a section through the folding tools for making the tube;

Figs. 9 and 11—a section through the folding tools for cable taping.

The tube press shown in Fig. 1 consists of a frame 1 in whose rear bearing 2 is rotatingly seated the band reel carrier 3. On the band reel carrier are fastened on bolts 4 the bearing arms 5. These carry the band reels 6 and also the band guiding and braking organs 7 and 8. The band material is wound round the rotatable core 9 which is rotated by any suitable means (not shown) and may be provided with a flat thread groove 9a (see Fig. 1), and folded by the folding tool arranged in the bearing 10 and formed into a tube 11 which is then wound round the drum 12. The bearing arm 5 (Fig. 2), rigidly clamped to the bolt 4 by the screw 13, carries a fixed bolt 14 on which the band reel 6 is rotatingly seated. The band 17 is conveniently pressed onto the reel by the roller 15 fixed on the lever 16. The band 17, Fig. 2, is guided over the rollers 18, 19, 20, 21, 22, of which Fig. 3 shows a constructional example of roller 22 in section. On the stay bolt 23, by way of example, the roller 22 is fixed on the rotating body 25 seated with ball bearings 24. By means of nut 26, disc 27, thrust ball-bearing 28 and rotating body 25 the roller 22 is pressed against the braking disc 29, which latter is secured against torsion by means of pins 30. The roller 22 can therefore be braked at will by tightening the nut 26.

Figs. 4 and 5 show how the band 17 is guided over an adjustable serpentine way. This serpentine way is constituted by the bolts 35, 36, 37, 38 seated on the bearing arm 5, the rollers 31 and 32 seated on the bolts 33 and 34, and the bolts 41, 42 fixed on the two-armed lever 40. The lever 40 is seated on the bolt 39. By means of tension spring 43 which is fixed at one end on the adjustable screw 44, the lever arm 40 is pulled. The screw 44 is adjustably fixed in the eye 45 of the bearing arm 5 so that the pull of the tension spring 43 can be regulated.

Fig. 6 shows the bearing of lever 40 and the fixing of bolts 33, 34, 35, 36, 37, 38 on the bearing arm 5, and also the fixing of the mobile bolts 41 and 42 on the lever 40. The drawn band has the tendency to follow a straight line from bolt 35 to bolt 36 (Fig. 5). It is, however, deflected by the bolts 41 and 42 which stand under the pull of spring 43, and consequently braked to a greater or lesser extent according to the tractive force of spring 43.

The tool for pressing the folds is shown in Figs. 8 to 11. The rotating threaded core 50 which like the core 9 may be rotated by any suitable means (not shown) is provided with a flat conveying thread 50' from which the coiled band material unwinds itself towards the following folded tool. The core 50 is furthermore provided with a threaded rib 51 whose pitch and pressure angle is uniformly decreasing. The thread construction here referred to is clearly shown in Figures 8 to 11 inclusive wherein each subsequent thread is pitched at a decreasing angle to the horizontal center line; the last thread at the right being almost at right angles to the center line. Likewise the angles at the sides of the thread are shown as gradually diminishing. Not only is the pitch angle of the threaded rib decreasing but also the width and height of the rib are, as and when required, made to taper to such an extent that the rib entirely disappears at "a" in Figs. 10 and 11. The threaded nut 52 included in the folding arrangement is designed in a similar manner. The nut 52 is mounted on a wheel 54 and rotated therewith. The mounting of the nut is clearly shown in Figure 7 of the drawing. The thread groove 53, which at b in Fig. 10 is still so wide that the band 17 is only bent by the rib 51, is getting narrower and narrower and the flanks of the groove 53 are gradually standing at an angle to the thread axis. The rib c formed in the band 17 in the first thread is already almost completely compressed in the second thread. When issuing from the last thread the rib is so far compressed that it has a square or rectangular section. The braking and upsetting organs hitherto required are therefore becoming unnecessary, thus almost entirely avoiding waste, but also considerably increasing the output by increasing the coiling speed.

According to the kind of band material used tapering of the thread is required to a greater or lesser extent so that Figs. 8 and 10 and 9 and 11 show the limits of the thread shapes.

Fig. 11 shows the folding tool according to Fig. 8, as used for covering various objects, as for instance cables, rubber hose and the like. In this tool not only the pitch of the rib 51' and this rib itself and also the thread groove 53' are tapered, but the tapering of the thread diameter, both core and outer diameter, is also provided for, by which means the coil winding is reduced from the diameter of the transfer thread 50' to the diameter of the object (cable) to be covered. In other words not only is the lead and slant or pitch of the thread reduced, but the outer diameters of the ribs or threads are progressively reduced and form a taper going from left to right.

Fig. 7 shows the drive and the bearing of the thread nut 52. This nut is rigidly connected with the chain wheel 54 which may be driven by means of a sprocket chain from a drive wheel (not shown) and rotates in the bearing 55, which latter is lodged in the bearing stand 3' of the machine frame 1.

The transfer thread cut on the core or hollow core before the folding thread has such a pitch that the conveying speed of the raw band material wound up with initial tension either exactly corresponds, or is greater than, the feeding speed of the folding tool proper, according to the kind of raw material used. The transfer threads are of such design that the conveyance of the band into the folding tools takes place without friction in the working direction of the core axis.

By means of the method according to the present invention and of the appliance provided for carrying it into execution it is possible to make flexible tubes and armourings of every suitable material with great speed in any desired length and diameter. Bands of metal, fibre, paper, tissue, artificial material, may be used in any desired combination for the production of tubes and armourings.

I claim:

The method of forming flexible endless tubes which consists in the steps of spirally winding strips of material to form an endless tube, continuously force feeding the endless tube as formed, forming said continuously force fed tube into helical corrugations while simultaneously uninterruptingly and progressively compressing together said helical corrugations, and uninterruptingly and progressively reducing the diameter of the so-compressed helical corrugations.

RUDOLF C. BREMER.

REFERENCES CITED

The following references are of record in the file of this patent:

UNITED STATES PATENTS

| Number | Name | Date |
| --- | --- | --- |
| 687,464 | Sullivan | Nov. 26, 1901 |
| 2,002,896 | Kopetz | May 28, 1935 |
| 2,054,024 | Pye | Sept. 8, 1936 |
| 2,033,717 | Kopetz | Mar. 10, 1936 |
| 2,343,096 | Stahl | Feb. 29, 1944 |